United States Patent [19]

Zlotek

[11] 4,162,000
[45] Jul. 24, 1979

[54] SPRAG FOR ONE-WAY CLUTCHES

[75] Inventor: Thaddeus F. Zlotek, Warren, Mich.

[73] Assignee: Dana Corporation, Toledo, Ohio

[21] Appl. No.: 801,816

[22] Filed: May 31, 1977

[51] Int. Cl.² ............................................. F16D 41/07
[52] U.S. Cl. ................................. 192/41 A; 192/45.1
[58] Field of Search ........................... 192/41 A, 45.1; 188/82.8

[56] References Cited

U.S. PATENT DOCUMENTS

| | | | |
|---|---|---|---|
| 2,597,241 | 5/1952 | Gruenberg et al. | 192/45.1 |
| 2,881,886 | 4/1959 | Troendly et al. | 192/45.1 |
| 3,019,873 | 2/1962 | Ferris et al. | 192/45.1 |
| 3,049,206 | 8/1962 | Zlotek | 192/45.1 |
| 3,819,019 | 6/1974 | Timtner | 192/45.1 X |

OTHER PUBLICATIONS

"Clutches and Brakes" Reprinted from 1973-1974 Power Transmission & Bearing Handbook Copr-1972, Industrial Publishing Co.-Div. of Pittway Corporation.

Primary Examiner—Allan D. Herrmann
Attorney, Agent, or Firm—Wilson, Fraser & Clemens

[57] ABSTRACT

A one-way clutch assembly having an annular outer race and an annular inner race, and a plurality of sprags spaced circumferentially within the space defined by the outer and inner races adapted to connect the outer and inner races during relative rotation thereof in one direction and to permit relative rotation thereof in the opposite direction. The sprags have camming surfaces at opposite ends thereof formed on arcs having their centers located within the profile of the sprag, while the terminal portion of at least one of the camming surfaces is formed on an arc having a center point outside the profile of the sprag.

3 Claims, 3 Drawing Figures

SPRAG FOR ONE-WAY CLUTCHES

SUMMARY OF THE INVENTION

Sprag type clutches are utilized in many industries notably in the nuclear-to-electrical energy conversion industry. Such clutch mechanisms are employed to protect nuclear pumps and associated drive motors, for example, against reverse rotation. One way clutches of the sprag-type may be substituted for check valves and electrical safeguards to prevent damage from a retrograde or backward movement of ancillary machinery. The coolant-circulation systems that move large volumes of water through nuclear reactors require components that can maintain efficiency when a subsystem malfunction occurs. In the typical pressurized water reactor primary coolant system and the typical boiling water reactor, there are four motor-driven pumps. The pumps are driven by very large motors (6000–12000 h.p.) and are arranged in parallel, all circulating the coolant through the reactor vessel. In the event one pump is deenergized, the amount of backflow through that pump must be limited in some fashion. Manifestly, prevention of reverse rotation is important because starting or stopping a reverse rotation pump can impose a severe strain on a drive motor and also the reverse flow of the coolant is not desirable and could result in inefficiency. The sprag-type backstopping clutch has been found successful in preventing reverse rotation of motor driven pumps. Such a clutch mechanism consists basically of a cylindrical inner race and a concentric cylindrical outer race. The annular space between the races is maintained by bearings and contains specifically formed wedges or cams, called sprags. Each sprag has a precision cam profile on the inner and outer surfaces. A backstop clutch mechanism is designed so that the outer race is connected to the motor shaft and the inner race is held stationary. During normal forward operation, the outer race overruns the inner race. At the instant of rotation reversal, however; the sprags engage and prevent the outer race and motor from rotating in the opposite direction.

Automatic engagement at zero speed is one of the most important characteristics of the sprag clutch. Engagment occurs instantaneously, before the motor-drive pump actually reverses. When the pump is shut down, its clutch continues to overrun as the pump slows. When the pump reaches zero speed, the clutch automatically engages by mechanical action to prevent reverse rotation.

In the past, small motor driven pump installations relied on similar ratchet type devices with gravity or centrifical force actuated pins adapted to engage in detents in a relatively rotating member to perform the clutching action. In relatively large systems of the type employed in the nuclear energy systems, the mechanical requirements are too severe for such devices. One of the primary deterrents to the use of ratchet and pin devices in the above application is that some reverse rotation is allowed to occur before they engage. With the mass of a pump flywheel which is 12 inches thick and 65 inches in diameter and weighs 11,000 pounds even a 3 degree rotation would require much energy to stop it. This is the reason the application of the stopping action at precisely the zero-speed point is important.

Since long life is important for a nuclear system, the sprag elements be formed of a high-carbon alloy steel with chromium diffused into the surface thereof. The resultant surface hardness has a high resistance to corrosion and to abrasion.

Other applications in the nuclear energy field include a standby device systems for the coolant pumps. In such systems, two or more motors, any one of which can drive, are coupled to the drive shaft for the pumps through sprag type clutches.

Upon exposure to excessive torque levels, the sprag elements may crush, roll-over, or otherwise cause irreparable damage to the race surfaces on which the opposite camming surfaces of the sprags are designed to bear.

It is an object of the present invention to produce a one-way clutch mechanism which when exposed to a torque loading in excess of its rated loading, the configuration of the sprag elements is effective to allow a relative movement between the outer and inner races in one direction without causing any substantial permanent damage to the clutch mechanism.

It is another object of the invention to produce a one-way clutch mechanism which is capable of being exposed to increased torque loading without an undue increase to overall dimensions.

Still another object of the invention is to produce a one-way clutch mechanism which will momentarily release the load at a torque level above the extremely high accident load level which must be within the clutch capability.

The objectives of the invention are typically achieved by a one-way clutch including an outer race having an inner surface and an inner race having an outer surface, the inner surface and the outer surface defining an annular space therebetween, a plurality of tiltable elements spaced circumferentially within the annular space adapted to connect the inner and outer races during relative rotation thereof in one direction and to permit relative rotation thereof in the opposite direction, the elements having camming surfaces at opposite ends thereof, portions of each of the cammed surfaces being arcs having spaced centers located between the opposite end of the elements and at least one of the camming surfaces having a portion of an arc of a radius wherein the center point lies outside of the profile of the elements.

DESCRIPTION OF THE DRAWINGS

The above, as well as other objects and advantages of the invention, will become readily apparent to one skilled in the art from reading the following detailed description of an embodiment of the invention when considered in the light of the following drawings, in which.

DETAILED DESCRIPTION OF AN EMBODIMENT OF THE INVENTION

Figure 1:
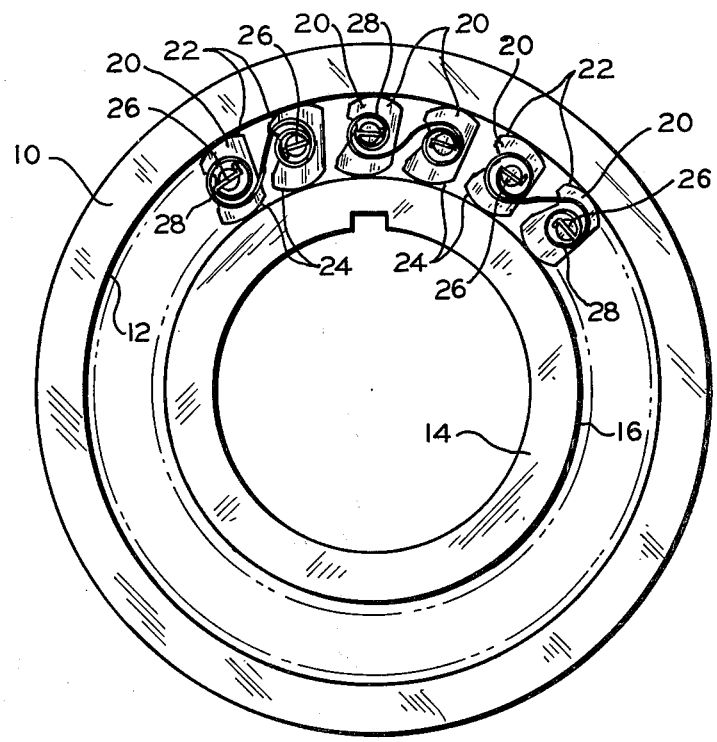
FIG. 1 is a fragmentary elevational view of a one-way clutch mechanism showing the improved construction of sprag elements between the inner surface of the outer race and the outer surface of the inner race.

The mechanism illustrated in FIG. 1 discloses an outer race 10 having an inner surface 12 and an inner race 14 havng an outer surface 16. The inner surface 12 of the outer race 10 and outer surface 16 of the inner race 14 are spaced apart so as to define a substantially annular space therebetween and a series of sprag elements 20 is disposed circumferentially within the annular space. The mechanism is adapted to operate so that the races 10 and 14 are connected together for rotation in one direction, but permits free relative rotation of the races in the opposite direction.

The inner surface 12 of the outer race 10 is formed with an internal cylindrical surface generated by a radius $R_o$ about a point 0. The outer surface 16 of the inner race 14 is formed with an internal cylindrical surface generated by a radius $R_i$ about the point 0.

Figure 2:
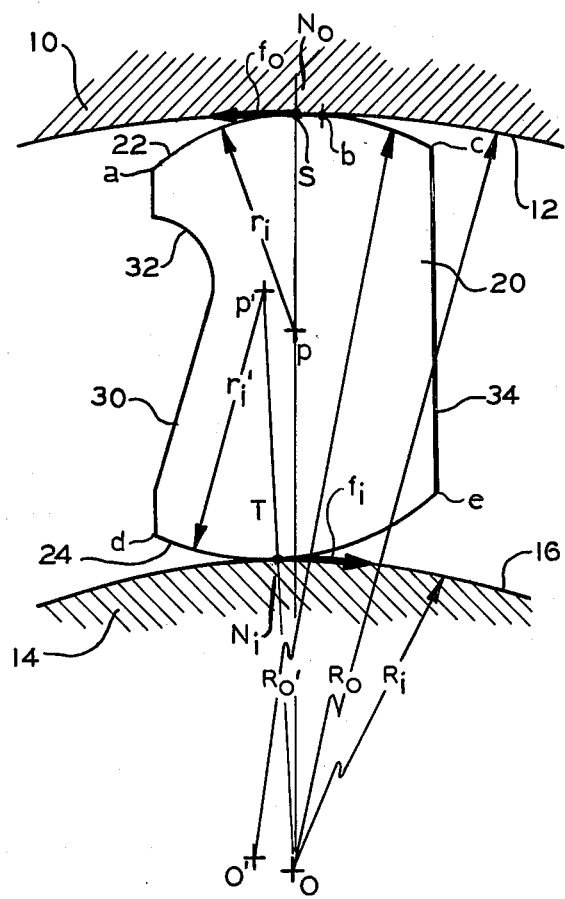
FIG. 2 is an enlarged fragmentary view of a portion of the mechanism illustrated in FIG. 1 showing the sprag element tilted into a locked position upon the application of the rated torque loading.
Figure 3:
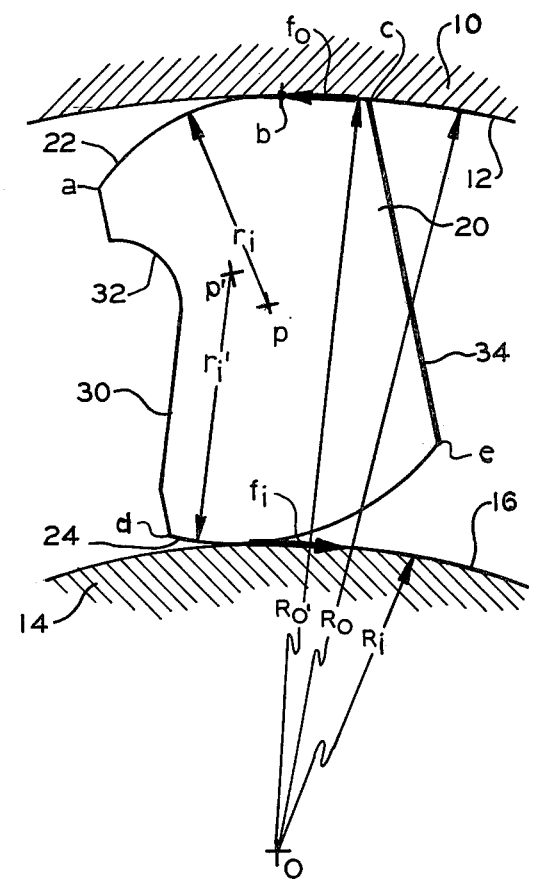
FIG. 3 is an enlarged fragmentary view similar to FIG. 2 showing the sprag element in a further tilted position as a result of a torque load in excess of the rated torque load of the mechanism.

The sprag elements 20 each have, as clearly illustrated in FIGS. 2 and 3, a race engaging camming surface 22 at one end thereof and a race engaging camming surface 24 at the opposite end thereof. The surface 22 is formed of two or more curved surfaces of different radii. The surface from point a to point b is formed with an outer rim cam surface generated by radius $r_i$ about a center point p disposed within the profile of the sprag element 20; while the surface from point b to point c is formed with an outer cylindrical cam surface generated by a radius $R_o'$ about a center 0' disposed outside of the profile of the sprag element 20 and is struck with the same radius as the radius $R_o$ of the inside surface 12 of the outer race 10. In practice, the point b is referred to as a blend point or that point at which two different curves blend together.

The bottom surface 24 of the sprag 20 is formed with a single cylindrical curve d–e which is formed with substantially the same radius as the curve a–b of the top surface 22. However, in order to render the desired camming or wedging action as the sprag element 20 tilts in a counter-clockwise direction, the center point p' of the curve d–e is literally offset from the center point p of the curve a–b.

The sprag elements 20, illustrated in FIG. 1 are typically formed with laterally extending trunions having slots 26 through which may pass spring means 28 for maintaining the elements 20. It will be understood that equally successful results may be obtained by forming other configurations of the elements 20 to receive the suitably designed spring means to maintain the elements of spaced relation.

Each of the sprag elements 20 is provided with a generally flat rear surface 30 terminating in an upwardly and outwardly extending section 32 typically formed on a radius. The front surface 34 is generally flat and extends vertically from point e to point c.

Attention is now directed to the operation of the one-way clutch mechanism wherein in FIG. 2 of the sprag elements have been tilted in a counter-clockwise direction causing the camming surfaces 22 and 24 to engage the adjacent race surfaces 12 and 16, respectively, and thereby cause the assembly to be in the "locked-up" condition. When the sprag elements 20 are in the "locked-up" condition, no relative motion occurs so as to rotation between the races 10 and 14. Accordingly, any torque applied to the inner race 14 will be transmitted through the sprag elements 20 to the outer race 10. While it is mentioned that there is no relative motion between the races 10 and 14, there may be "wind-up" in one of the races in respect to the other, depending on the physical and metallurgical parameters of the races and the amount of torque applied to the system.

Torque is transmitted from one race to the other through the sprags 20 when they are in an engaged condition between the races 10 and 14. This torque is transmitted by means of a frictional force existing between the surfaces 12 and 22 and between the surface 16 and 24. In accordance with the well known physical principles, the direction of this frictional force must be parallel to the surfaces at the point of contact of the surfaces. Therefore, the frictional force between the surfaces 12 and 22, designated by $f_o$, lies along a tangent between the surfaces 12 and 22 at the point S. Similarly, the frictional force between the surfaces 16 and 24, designated by $f_i$, lies along a tangent to the surface 16 and 24 at the point T.

Torque is defined as the vector product of a force times the perpendicular radius between the force and the axis of rotation. The torque applied to the sprags 20 at the point T is thus equal to the product of $f_i$ times $R_i$, and the torque applied at the point S is equal to the product of $f_o$ times $R_o$. Since the sprags 20 are in rotational equilibrium in an engaged condition, the torque applied at T must be equal and opposite to the torque applied at S and since $R_o$ is greater than $R_i$, the force $f_i$ must be greater than $f_o$.

The torque transmitted through the sprag 20 is thus directly related to the frictional forces $f_i$ and $f_o$ existing between the sprags 20 and the races 10 and 14. The frictional forces $f_i$ and $f_o$ are variable quantities and are limited by the coefficients of friction $u_i$ and $u_o$ between the sprag 20 and the races 14 and 10, respectively, and are directly related to the normal forces $N_i$ and $N_o$ exerted by the races 14 and 10, respectively, upon the sprag 20. The limiting relationships are given by the formula $f_i = u_i N_i$ and $f_o = u_o N_o$. In most applications, the coefficients of friction $u_i$ and $u_o$ will be equal if the inner and outer races are of the same material, but for purposes of this description, this condition need not be so. The normal force $N_i$, by definition, must lie on the line Op' and is applied to the sprag 20 at point T. Similarly, the normal force $N_o$ lies along the line Op and is applied to the sprag 20 at point S. Since the sprag 20 when engaged is in translational as well as rotational equilibrium, the resultant of the forces $N_i$ and $f_i$ must lie along the line of action ST and must be equal and opposite in direction to the resultant of the forces $N_o$ and $f_o$.

It should be noted that as the sprag element 20 rock or tilt from the position generally shown in FIG. 1 to the position shown in FIG. 2, (and subsequently to the position shown in FIG. 3) the radial dimension thereof continuously increases at at a rate determined by the camming surfaces, thereby causing greater and greater frictional engagement between the camming surfaces 22 and 24 of the sprag elements 20 as more torque is applied to the system up to the rated torque for the particular design.

The one-way clutch mechanism thus far illustrated and described employs sprag elements 20 wherein the camming surface 24 adjacent the outer surface 16 of the inner race 14 is formed on a single arc, the center point of which is located within the profile of the sprag, and the opposite camming surface 22 adjacent the inner surface 12 of the outer race 10 is formed on two arcs the center point of one of which is located within the profile of the sprag while the center point of the other is located outside of the profile of the sprag. The invention further encompasses the concept of the reversal of the camming surfaces wherein the camming surface adjacent the outer surface of the inner race is comprised of two arcs, the center point of one of which is located outside the sprag profile, and the opposite caming surface adjacent the inner surface of the outer race is formed on a single arc with its center point located within the sprag profile.

In summary, it has been found that the instant invention has produced a one-way clutch mechanism including inner and outer races which may be mechanically coupled together by the action of a plurality of tiltable elements, which increase in overall effective dimension as they are tilted or rocked in a given direction. In order to effectively and momentarily absorb an excessive torque without adversely damaging the operative parts thereof, the tiltable elements are formed with camming surfaces at opposite ends thereof at least one of which includes an arc having a radius with a center point lying outside the profile of the element. The extreme limit of the radius on which the aforementioned surface is formed is the radius of the inner surface of the outer race.

However, should a circumstance occur where through some unforeseen happenstance an inordinate amount of momemtary excessive torque is applied to the input connection of the mechanism, the sprag elements 20 would be tilted or rocked on additional counterclockwise quantum causing the portion of the camming surface 22 between the points b and c to move into contact with the adjacent inner surface 12 of the outer race 10. The excessive torque levels then applied to the system will cause the camming surface 22 between points b and c to slide across the inner surface 12 of the outer 10 thereby preventing any roll-over of the sprag elements 20 and avoid applying a load sufficient to crush the sprag elements 20.

Once the excessive torque loading is reduced and returned toward the normal torque loading, the race 10 turns in a clockwise direction relative to the race 14, and by virtue of such relative rotation of the races from the position illustrated in FIG. 3 to the position illustrated in FIG. 1 causes the races to be completely disengaged, inasmuch as the radial dimension of the sprag elements 20 have decreased.

It must be understood that in order to avoid any permanent change to the associated clutch mechanism, the deflection of the outer and inner races, due to the increase in overall dimension of the sprags during excessive torque loadings, must be limited to levels below which permanent plastic deformations would occur.

What is claimed is:

1. In a one-way clutch including an outer race having an inner surface and an inner race having an outer surface, the inner surface and the outer surface defining an annular space therebetween, a plurality of tiltable elements disposed circumferentially within the annular space adapted to connect the inner and outer races during relative rotation thereof in one direction and to permit relative rotation thereof in the opposite direction, said elements having camming surfaces being arcs having laterally spaced centers located within the profile of said elements and at least one of said camming surfaces having a portion formed on an arc of a radius with a center point outside the profile of said elements.

2. The invention defined in claim 1 wherein the portion of said camming surface formed on an arc of a radius with a center point outside the profile of said elements is the terminating portion of said surface.

3. The invention defined in claim 1 wherein said camming surface containing the portion on an arc of a radius with a center point outside the profile of said elements is the surface adjacent the inner surface of the outer race.

* * * * *